(12) United States Patent
Kappel et al.

(10) Patent No.: US 8,261,122 B1
(45) Date of Patent: Sep. 4, 2012

(54) ESTIMATION OF RECOVERY TIME, VALIDATION OF RECOVERABILITY, AND DECISION SUPPORT USING RECOVERY METRICS, TARGETS, AND OBJECTIVES

(75) Inventors: Steven Kappel, Savage, MN (US); Shelley A. Schmokel, Prior Lake, MN (US); Guido Westenberg, Minneapolis, MN (US); Branka Rakic, Maple Grove, MN (US); Peter A. Barber, Surrey (GB); Julianne M. Urban, Stillwater, MN (US); Nancy L. Bayer, Arden Hills, MN (US); Linda Cerni, San Ramon, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2111 days.

(21) Appl. No.: 10/881,545

(22) Filed: Jun. 30, 2004

(51) Int. Cl.
*G06F 11/00* (2006.01)
(52) U.S. Cl. ............................. 714/2; 714/26; 714/33
(58) Field of Classification Search ................ 714/2, 26, 714/33
See application file for complete search history.

(56) References Cited

U.S. PATENT DOCUMENTS

| | | | | |
|---|---|---|---|---|
| 5,325,525 A * | 6/1994 | Shan et al. | ..................... | 718/104 |
| 6,044,475 A * | 3/2000 | Chung et al. | ..................... | 714/15 |
| 6,170,009 B1 | 1/2001 | Mandal et al. | | |
| 6,263,359 B1 * | 7/2001 | Fong et al. | ..................... | 718/103 |
| 6,351,754 B1 * | 2/2002 | Bridge et al. | ................. | 707/202 |
| 6,697,960 B1 * | 2/2004 | Clark et al. | ..................... | 714/15 |
| 6,763,321 B2 * | 7/2004 | Gross et al. | ................... | 702/186 |
| 6,820,217 B2 * | 11/2004 | Mock et al. | ...................... | 714/15 |
| 6,959,401 B2 * | 10/2005 | Lomet et al. | ..................... | 714/16 |
| 7,020,599 B1 * | 3/2006 | Cao et al. | ......................... | 703/22 |
| 7,133,804 B2 * | 11/2006 | Tonack et al. | ................. | 702/184 |
| 7,313,731 B2 * | 12/2007 | Smith et al. | ..................... | 714/34 |
| 2001/0039525 A1 * | 11/2001 | Messmer et al. | ................ | 705/36 |
| 2002/0049912 A1 | 4/2002 | Honjo et al. | | |
| 2002/0095317 A1 * | 7/2002 | McCabe | ........................... | 705/4 |
| 2003/0061537 A1 * | 3/2003 | Cha et al. | ......................... | 714/16 |
| 2003/0084372 A1 * | 5/2003 | Mock et al. | ..................... | 714/15 |
| 2003/0200490 A1 * | 10/2003 | Goudie | ........................ | 714/704 |
| 2003/0225800 A1 | 12/2003 | Kavuri | | |

(Continued)

OTHER PUBLICATIONS

IGG-03172004-01, C. Claunch, "Management Update: Best Practices in Business Continuity and Disaster Recovery," Artivle Mar. 17, 2004, Gartner, Inc., 13 pages.

(Continued)

*Primary Examiner* — Scott Baderman
*Assistant Examiner* — Loan L. T. Truong
(74) *Attorney, Agent, or Firm* — Lawrence J. Merkel; Meyertons, Hood, Kivlin, Kowert & Goetzel, P.C.

(57) ABSTRACT

In some embodiments, a method is provided and a computer accessible medium comprising instructions which, when executed, implement the method is also provided. A recovery time for recovery of at least one asset is estimated responsive to at least one metric represented in metric data. The metric data is accumulated prior to the estimation. In various embodiments, data protection operations may include one or more of asset copy operations, recovery operations, etc. The estimated recovery time may be reported to a user. In other embodiments, metric data may be used to validate recoverability. In still other embodiments, recovery metrics may be calculated and displayed to the user along with corresponding recovery targets and objectives.

32 Claims, 4 Drawing Sheets

U.S. PATENT DOCUMENTS

| | | | |
|---|---|---|---|
| 2003/0225801 A1 | 12/2003 | Devarakonda et al. | |
| 2004/0078334 A1 | 4/2004 | Malcolm et al. | |
| 2004/0128470 A1* | 7/2004 | Hetzler et al. | 711/209 |
| 2004/0139302 A1* | 7/2004 | Flautner et al. | 712/220 |
| 2004/0258083 A1* | 12/2004 | Chen | 370/437 |
| 2004/0260660 A1* | 12/2004 | Ando | 705/400 |
| 2004/0260750 A1* | 12/2004 | Ruutu et al. | 709/200 |
| 2005/0015641 A1* | 1/2005 | Alur et al. | 714/2 |
| 2005/0021882 A1* | 1/2005 | Murata et al. | 710/19 |
| 2005/0066239 A1 | 3/2005 | Keeton et al. | |
| 2005/0102547 A1 | 5/2005 | Keeton et al. | |
| 2005/0216370 A1* | 9/2005 | Chao et al. | 705/28 |
| 2006/0129562 A1* | 6/2006 | Pulamarasetti et al. | 707/10 |
| 2006/0248125 A1* | 11/2006 | Kawamura | 707/201 |

OTHER PUBLICATIONS

Strategic Planning, SPA-21-3174, R. Paquet, C. DiCenzo, "Predicts 2004: Recovery Replaces Backup and Replication," Resaeach Note, Nov. 18, 2003, Gartner, Inc., 3 pages.

Dynamic Markets "Utility Computer: The CIO Squeeze?", Independent Market Research Repot commissioned by VERITAS, Sep. 2003, 151 pages.

Kimberly Keeton, et al., "Automatic Design of Dependable Data Storage Systems," Jun. 2003, 6 pages.

Kimberly Keeton, et al., "Automating Data Dependability," ACM-SIGOPS European Workship, Saint-Emilion, France, Sep. 2002, 8 pages.

* cited by examiner

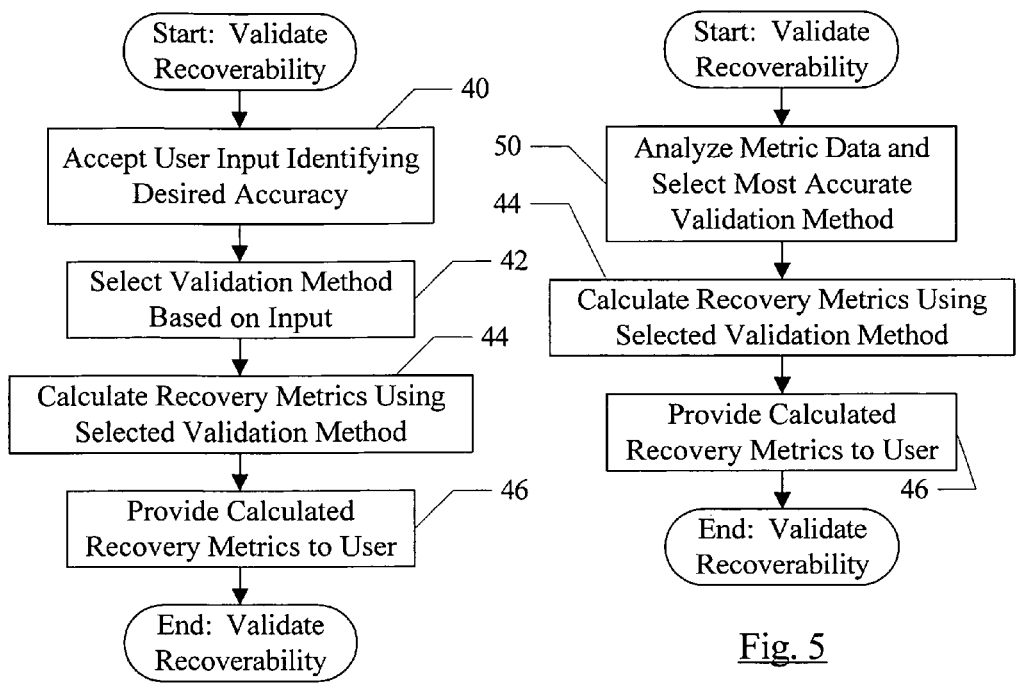
Fig. 4
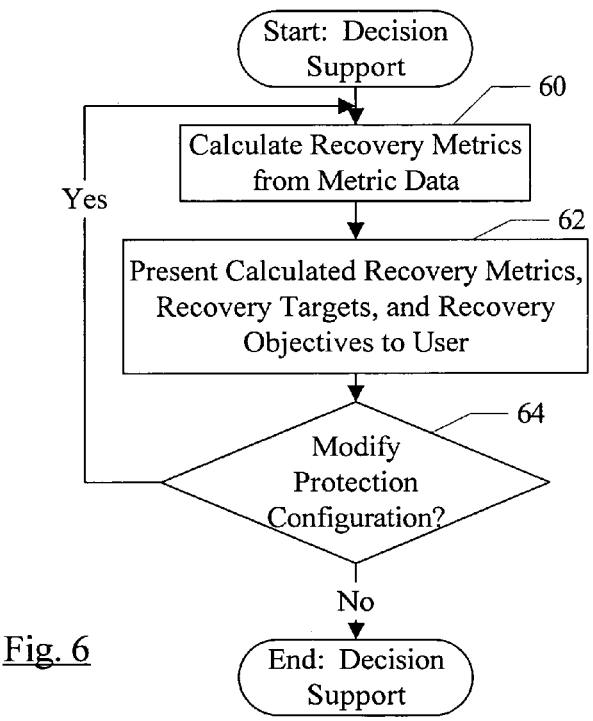
Fig. 5
Fig. 6

ESTIMATION OF RECOVERY TIME, VALIDATION OF RECOVERABILITY, AND DECISION SUPPORT USING RECOVERY METRICS, TARGETS, AND OBJECTIVES

BACKGROUND OF THE INVENTION

1. Field of the Invention

This invention is related to the field of data protection and recovery in computer systems.

2. Description of the Related Art

Data protection for computer systems is an important part of ensuring that the information generated on a computer system and/or stored on the computer system is not lost due to the occurrence of a hardware failure, a software failure, user error, or other environmental event (e.g. power outage, natural disaster, intentionally-caused disaster, accidental disaster, etc.). Generally, events that the data protection scheme is designed to protect against are referred to herein as disaster events. The data protection scheme attempts to make redundant copies of the data and locate those copies such that the data is safe from the disaster events and such that the data can be restored to the computer system or to another computer system rapidly enough to be acceptable given the nature of the data, its importance to the creator of the data, etc.

While restoration of the data after a disaster event is part of recovery, restoration alone may not be enough to ensure recovery. Generally, recovery refers to actually bringing back into operation the applications and other software/functionality that were in operation on a computer system or systems prior to the disaster event. Generally, the application software, the underlying operating system software, and data/configuration files for the application and operating system must be restored to a logically consistent state to permit recovery.

Recovery is frequently performed under significant time pressure. Unfortunately, current data protection tools are not focused on recovery. Determining how long a recovery operation will take is frequently merely guesswork for the administrator performing the recovery. When multiple recovery operations are needed and time pressure is high, the guesses are insufficient to help the administrator plan the overall recovery.

Increasingly, organizations are adopting formal service level agreements (SLAs) with their information technology (IT) departments or third party IT providers. Disaster recovery planners (and/or business continuity planners) in the organization assign recovery requirements to various information assets based on the importance of the information assets to the continued functioning of the organization. Currently, the disaster recovery planners specify a recovery point objective (RPO) and a recovery time objection (RTO). The RPO indicates, relative to a specified point in time, how close in time that it must be possible to recover the state of the corresponding information asset. For example, an RPO of 0 indicates that is must be possible to recover the state of the information asset at any point in time. On the other hand, an RPO of 30 minutes indicates that is must be possible to recover the state of the information asset to a state within 30 minutes of the specified point in time. The RTO specifies the maximum amount of time that the recovery operation may take.

The RTO and RPO are objectives, but they may not actually be achievable given data protection technology, budgetary constraints, etc. Accordingly, corresponding recovery targets (recovery time target (RTT) and recovery point target (RPT)) are negotiated by the disaster recovery planners/business continuity planners with the IT department/provider. The RTT and the RPT are formalized as the SLA. Typically, SLAs only cover the immediate recovery of the current state of an asset in response to a disaster event.

Once the SLAs are in place, the IT department/provider must then establish a protection scheme for the information assets that will meet the SLA. There are myriad protection schemes and protection products available which may provide pieces of an overall protection solution that would meet an SLA. However, the number of combinations and permutations of schemes is dauntingly large. Additionally, protection schemes and products are typically focused on the protection provided, not on the recovery metrics that may be achievable using the schemes/products to recover from a disaster event. Thus, it is difficult to determine if a protection scheme will meet a given SLA. Additionally, it is desirable over time to revise the SLA (the recovery targets) to come closer to meeting the recovery objectives.

SUMMARY OF THE INVENTION

In some embodiments, a method is provided and a computer accessible medium comprising instructions which, when executed, implement the method is also provided. A recovery time for recovery of at least one asset is estimated responsive to at least one metric represented in metric data. The metric data is accumulated prior to the estimation. For example, the metric data may be accumulated during one or more data protection operations, in one embodiment. In another embodiment, metric data may be accumulated during normal operation of the asset. In various embodiments, data protection operations may include one or more of asset copy operations, recovery operations, etc. The estimated recovery time may be reported to a user. In other embodiments, metric data may be used to validate recoverability. In still other embodiments, recovery metrics may be calculated and displayed to the user along with corresponding recovery targets and objectives.

BRIEF DESCRIPTION OF THE DRAWINGS

The following detailed description makes reference to the accompanying drawings, which are now briefly described.

FIG. 4 is a flowchart illustrating operation of one embodiment of a recovery manager shown in FIG. 1 to validate recoverability.

FIG. 5 is a flowchart illustrating operation of another embodiment of a recovery manager shown in FIG. 1 to validate recoverability.

FIG. 6 is a flowchart illustrating operation of one embodiment of a recovery manager shown in FIG. 1 to provide decision support based on recovery metrics, targets, and objectives.

Figure 1:
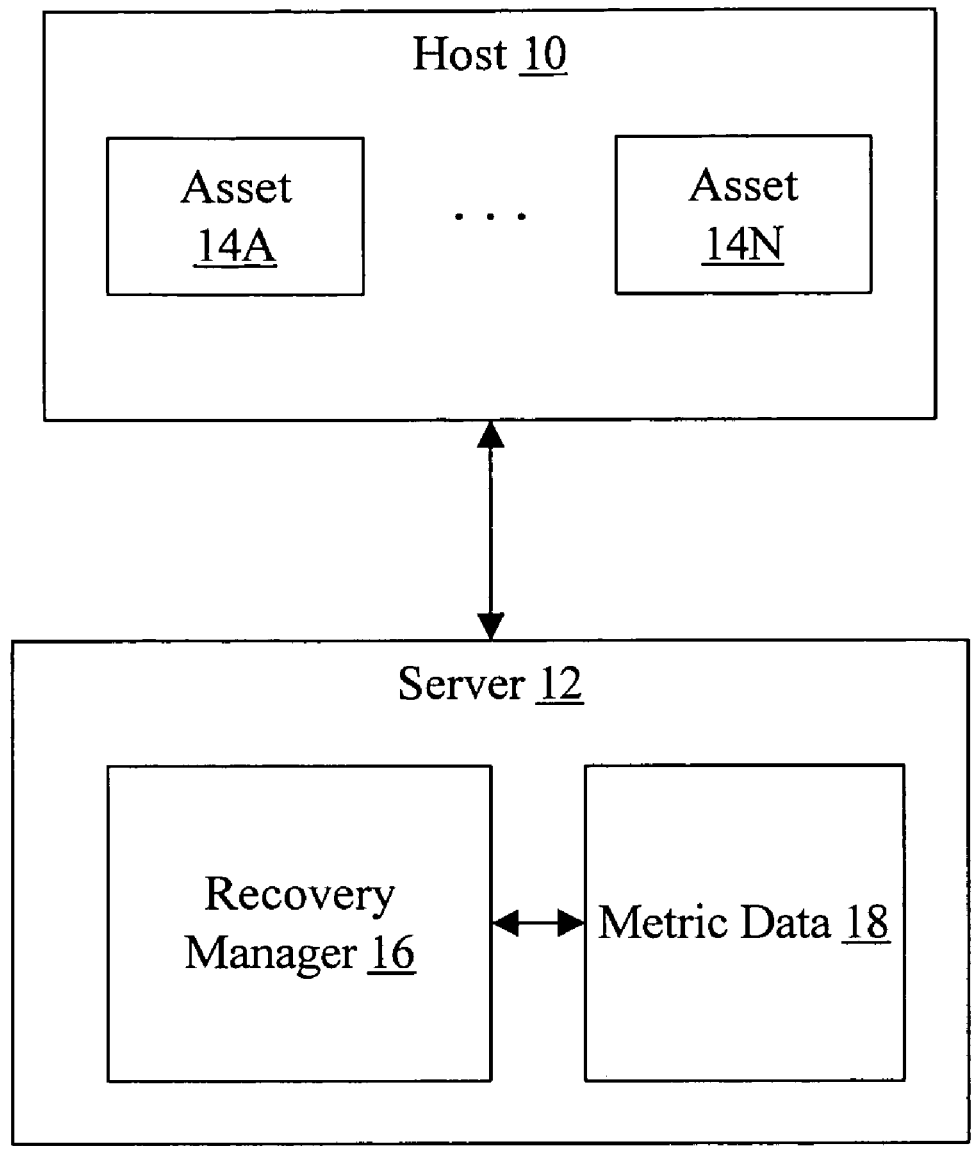
FIG. 1 is a block diagram of one embodiment of a host and a server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a host 10 and a server 12. The host 10 is coupled to the server 12. The host 10 includes one or more assets (e.g. assets 14A-14N in FIG. 1). In the illustrated embodiment, the server 12 includes a recovery manager 16. In the illustrated embodiment, the server also includes metric data 18.

Generally, the assets 14A-14N are each an entity of computer system data and/or functionality on the host 10 that is to be protected such that it can be recovered after a disaster event. In the context of an asset, computer system data is being used in its generic sense to refer to both data and instruction code, in general, although a given asset may comprise only data or only instruction code. In some cases, a given asset 14A-14N may be a "physical" asset (e.g. a file, the data on a volume or on a physical disk, the data comprising a server, etc.). In other cases, a given asset may be a "logical" asset which groups together two or more assets. The assets comprising a logical asset are referred to as component assets. Component assets may be physical assets, or may themselves be logical assets in some embodiments. For example, an application environment may be a logical asset and may comprise one or more of the application itself, various configuration files for the application, various data files created by and/or used by the application, the volume(s) and/or file system(s) used by the application, the in-memory state of the application if the application is executing, one or more web servers that interface with the application, etc. As a more specific example, the logical asset may be an SAP AG application and the component assets may include the application, one or more underlying databases, one or more web servers, configuration and data files, and in-memory state. In some cases, an asset may span multiple computer systems. That is, portions of the asset may reside on different computer systems.

The recovery manager 16 comprises software configured to assist in recovering one or more of the assets 14A-14N (e.g. if a disaster event occurs). In various embodiments, the recovery manager 16 may provide varying amounts of assistance, from providing decision support/recovery guidance to a user up to fully automating the recovery.

In some embodiments, the recovery manager 16 may accumulate metric data 18 as various data protection operations occur. As used herein, data protection operations may include any operations performed to ensure the protection and recovery of assets. For example, data protection operations may include various asset copy operations, in which the asset's computer system data is copied (e.g. either to various storage media or to another computer system). For example, asset copy operations may include backup operations, bare metal restore backup operations (which create a backup and capture other configuration information to permit restore to a computer system on which no software, including operating system software, has been installed), or replication operations. Data protection operations may also include cluster operation, in some embodiments. Data protection operations may also include recovery operations (in which an asset or assets are recovered). As used herein, recovery of an asset refers to retrieving the asset's computer system data in a logically consistent state. If the asset or assets include an application or other software, recovery may include ensuring that the application/software is restarted and properly operating. Data protection operations may also include simulation of recovery operations or testing of recoverability. Testing may be performed in a variety of fashions, such as on a similarly-configured host, either on site with the host 10 or elsewhere, such as a disaster recovery site. Testing may include performing a partial recovery of an asset or a complete recovery of the asset. Testing may also include testing various aspects of recovery, such as verifying the media on which an asset copy is stored, verifying the data integrity of the asset copy, verifying data path connectivity to the asset copy, and/or verifying the data path performance.

The metric data 18 may represent any desired metrics measured or captured during the data protection operations. In general, a metric may be any recordable item of information corresponding to an operation. For example, the time elapsed during the data protection operation may be a metric. The size of the asset operated upon in the data protection operation may also be a metric. Various embodiments may also capture other aspects of the host 10 and or the environment in which the recovery is performed as metrics. For example, the hardware capabilities of the host 10 may be captured via metrics. The hardware capabilities may include, in various embodiments, one or more of: the network capabilities (e.g. the network connection speed, type of network connection, network hardware), the media used, the media interface device capabilities (e.g. tape drive performance), the processing power of the host, and the storage subsystem parameters (e.g. high performance disk/disk array versus single disk or lower performance disk). Metrics representing the software may also be captured (e.g. operating system/version, driver information, type of data protection software, etc.). Metrics corresponding to the environment may include the network activity/bandwidth at the time of the data protection operation, resource utilization, etc.

In some embodiments, the recovery manager 16 may accumulate metric data 18 during normal operation of the assets 14A-14N. The normal operation may include times when data protection operations are not being performed for the assets 14A-14N. For example, performance monitoring tools or other monitoring tools may measure various metrics during operation and may provide the metrics to the recovery manager 16 for accumulation in the metric data 18. Alternatively or in addition, the recovery manager 16 may measure metrics during normal operation for accumulation in the metric data 18. In some embodiments, the performance monitoring tools may include the VERITAS I³™ software available from VERITAS Software Corporation (Mountain View, Calif.). In general, performance monitoring tools and/or other monitoring tools may comprise any combination of hardware and/or software.

The metrics accumulated during normal operation may provide, in some embodiments, historical environmental data which may be used to characterize activity level at a given point in time. For example, certain times of the day or certain days of the week may be characterized by higher levels of activity in the computing environment of the assets 14A-14N than other times. As one specific example, Monday mornings may be characterized by higher levels of activity as the work week is started. Any desired metrics may be accumulated during normal operation.

The metric data 18 may be stored in any desired format. For example, there may be an entry in the metric data 18 for each execution of a data protection operation, storing the metrics collected from that execution. There may also be an entry or entries in the metric data 18 corresponding to times of normal operation of the assets 14A-14N (e.g. entries containing metrics measured by performance monitoring tools or other monitoring tools). The metric data 18 may be a database, in some embodiments, managed by a database management system (DBMS), and may particularly be a relational data base managed by a relational database management system (RDBMS). Alternatively, the metric data 18 may be a table of entries, or any other file format.

In some embodiments, the recovery manager 16 may use the metric data 18 to estimate the recovery time for recovering one or more assets 14A-14N. That is, the recovery time may be the time required to complete the recovery of the assets. Having an estimate of the recovery time may aid the user (e.g. an administrator) in planning the recovery. For example, if the user deems the estimated recovery time is too long, the user may select another recovery method for the asset. Alternatively, knowing the estimated recovery time may allow the user to plan other activities. For example, the user may start the recovery operation and may pursue other activities while the recovery operation occurs. As a more particular example, the user may engage in planning post-recovery activities while the recovery operation occurs. The user may check on the recovery near the end of the estimated recovery time.

In other embodiments, the recovery manager 16 may use the metric data 18 to validate recoverability. That is, the metric data 18 may be used in one or more methods to calculate the expected recovery metrics that may be achieved for a given asset or assets, and the recovery metrics may be compared to the recovery targets (e.g. to determine if SLAs can be expected to be met). In other cases, the recovery manager 16 may use the metric data 18 to calculate recovery metrics, and may provide the user with information regarding the recovery metrics, the corresponding recovery targets, and the corresponding recovery objectives to provide decision support to the user as the user attempts to improve deployed data protection methods and characteristics to better meet recovery targets and/or to move recovery targets/metrics closer to meeting recovery objectives.

As used herein, the term "recovery metrics" refers to actual, measured metrics of recovery operations. The recovery metrics may include, for example, the recovery time and the recovery point (relative to a desired recovery point). The recovery metrics may also include any other desired values in other embodiments. The term "recovery targets" refer to the agreed-upon values that the data protection system is intended to support (e.g. the RPT and RTT described above, formalized in SLAs in some embodiments). Each recovery target may correspond to a recovery metric (e.g. the RPT may correspond to the recovery point and the RTT may correspond to the recovery time). The term "recovery objectives" refers to the idealized goals of the disaster recovery planners/business continuity planners. For example, the RPO and RTO described above may be included in the recovery objectives, in some embodiments. Each recovery objective may correspond to a recovery metric (e.g. the RPO may correspond to the recovery point and the RTO may correspond to the recovery time).

It is noted that, in various embodiments, the metric data 18 may be captured for subsets of the data protection operations described above. For example, some embodiments may capture metrics for recovery operations. Some embodiments which provide decision support by displaying recovery metrics, recovery targets, and recovery objectives may only use metrics from recovery operations, for example. Additionally, a subset of the metrics may be captured in other embodiments. In still other embodiments, subsets of the metrics and any additional desired metrics may be captured. Still further, differing subsets of metrics (overlapping or non-overlapping) may be captured for different types of data protection operations, in some embodiments. Any subset of metrics captured and/or data protection operations for which metrics are captured may be used in various embodiments.

In some embodiments, the recovery targets may be encapsulated in one or more RT sets. Each RT set comprises properties describing the desired recoverability of the asset(s) to which the RT set is subsequently applied. For example, in the present implementation, each RT set comprises a recovery point target (RPT), a recovery time target (RTT), and one or more other properties. The RTT specifies the maximum amount of time that the process of recovering the asset may take. The RPT is specified relative to a selected point in time at which the state of the asset is desired to be recovered. Specifically, the RPT specifies the amount of time relative to the selected point in time within which a state of the asset is to be recoverable. That is, a state corresponding to a point in time within the RPT of the selected point in time is to be recoverable. The RPT may thus be viewed as a measure of acceptable data loss. In many recoveries, the selected point may be the time at which the disaster event occurred. In other cases, the selected point may be a point in the past (e.g. prior to a virus infection, or a defined point in time for recovery for legal/regulatory reasons).

The other properties of the RT set may be defined to assist in automated setup of a protection plan for the assets to be associated with the RT set. The RPT and RTT may assist in the automated setup as well. Generally, a protection plan may comprise one or more protection methods that are configured to protect a given asset. Exemplary properties that may be included in some embodiments may include a duration (specifying the period of time over which the RT set applies), robustness properties (such as the number of copies, copy location, quality of storage for the copies, etc.), and other properties such as security options, expense properties, etc.

In some embodiments, RT sets may be directly applied to assets 14A-14N. In other embodiments, the recovery manager 16 may be configured to define one or more recovery classes. Each recovery class includes one or more RT sets. In one embodiment, the recovery classes may be applied to the assets 14A-14N to define recovery requirements over the life cycle of a given state of the assets 14A-14N. Different recovery classes may be defined for application to assets dependent on the importance of the assets to the owner of the assets (e.g. the organization that owns the host 10, such as a business enterprise). That is, each recovery class may represent a different level of importance. A given asset's importance to the organization may be determined, and the recovery class corresponding to that level of importance may be applied to the given asset. The recovery requirements of the given asset state over its life cycle are described by the recovery class applied to the given asset. Protection methods may be configured for the given asset to meet the recovery requirements indicated by the recovery class applied to the given asset. Additionally, using multiple RT sets in a recovery class to define the recovery requirements over the asset state life cycle may permit the recovery requirements to change as an asset state ages.

The host 10 comprises one or more computer systems that store and/or manipulate and/or execute the assets 14A-14N. In some cases, external storage such as network attached storage (NAS) or storage area network (SAN) storage may store some of the assets 14A-14N, and the host 10 may comprise the NAS/SAN storage as well.

In the illustrated embodiment, the server 12 executes the recovery manager 16. Generally, the server 12 comprises software that may be executed on a computer system. In some embodiments, the server 12 may be executed on a separate computer system from those in the host 10. In such embodiments, the computer system executing the server 12 may be configured to communicate with the computer system(s) in the host 10 (e.g. via a network). In other embodiments, the server 12 may be executed on a computer system in the host 10. Additionally, some embodiments may include no servers (that is, the recovery manager 16 may be executed on the host 10). In still other embodiments, the recovery manager 16 may be executed on another computer system that has no server relationship to the host 10 (e.g. on an administrator's computer system).

In various embodiments, user input may be accepted. User input may be provided to the recovery manager 16 in any desired fashion. Generally, the computer system that is executing the recover manager 16 may have one or more user input devices such as a keyboard, a mouse or other pointing device, voice input, touch screen, etc. The user may provide user input via the user input devices. In other cases, user input may be asynchronous and/or automatic. For example, the user may preconfigure automatic information feeds into the recovery manager 16, such as an application programming interface that redirects information from other systems/databases. Alternatively, input may be provided through files, transmitted from other applications, etc.

Figures 2, 3:
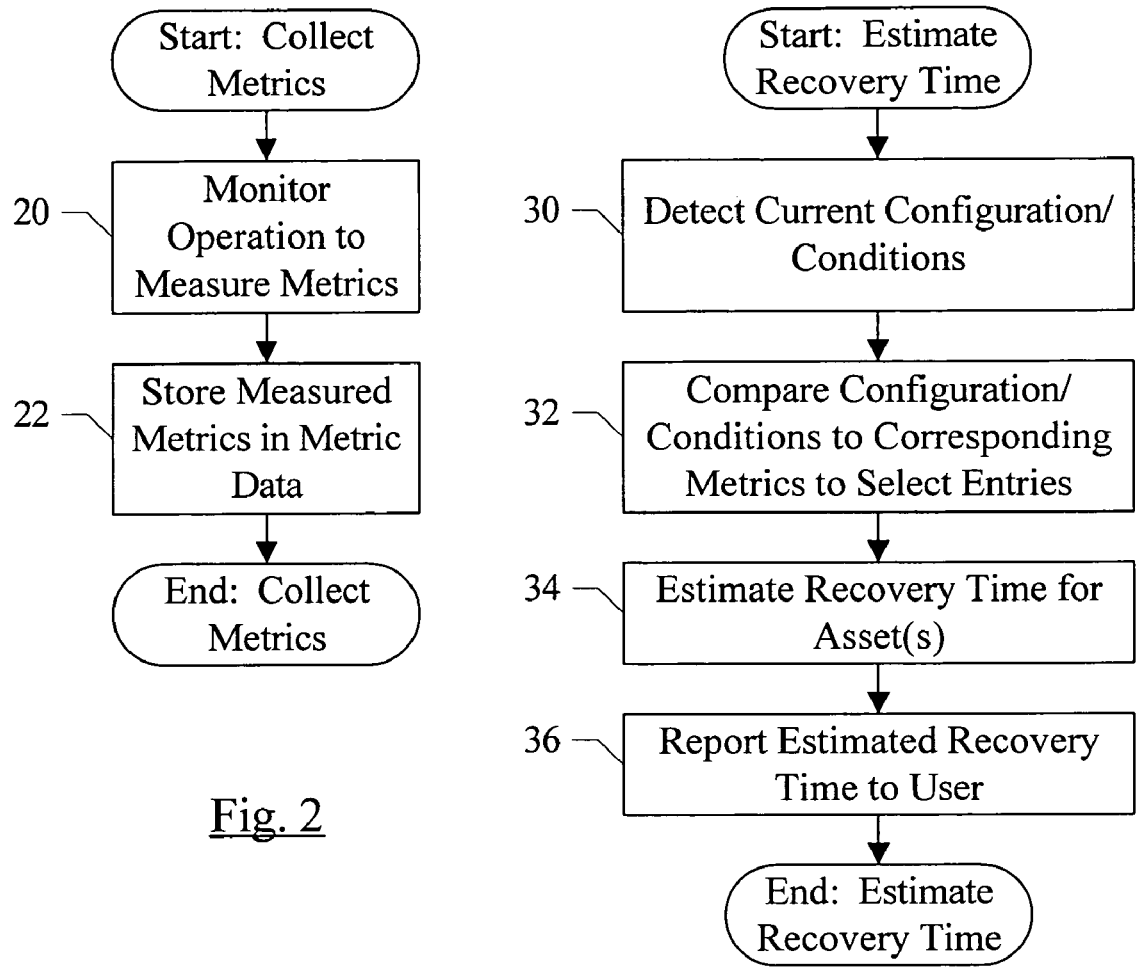
FIG. 2 is a flowchart illustrating operation of one embodiment of a recovery manager shown in FIG. 1 to collect metrics.
FIG. 3 is a flowchart illustrating operation of one embodiment of a recovery manager shown in FIG. 1 to estimate recovery time.

FIG. 2 is a flowchart illustrating operation of one embodiment of the recovery manager 16 for collecting metrics. The recovery manager 16 may include instructions which, when executed, implement the operation shown in FIG. 2. Generally, the operation shown in the flowchart of FIG. 2 may be performed at any time that collecting metrics is desirable. For example, the operation shown in FIG. 2 may be performed during any data protection operations for which collecting metrics is desirable. As another example, the operation shown in FIG. 2 may be performed during normal operation of a protected asset or assets to collect metrics. By performing the operation shown in FIG. 2 for various data protection operations, metrics may be accumulated over time in the metric data 18.

The recovery manager 16 may monitor the data protection operation, the host 10, and other environment factors to measure/capture metrics (block 20). In some embodiments, the recovery manager 16 may directly measure/capture metrics. In other embodiments, the software and/or hardware implementing the data protection operation may measure/capture metrics and provide them to the recovery manager 16. In still other embodiments, the recovery manager 16 may measure/capture some metrics and the software/hardware implementing the data protection operation may measure/capture other metrics. In some cases, discovery mechanisms may be used to capture some metrics (e.g. hardware capabilities, software, etc.). In other cases, the recovery manager 16 may receive metrics measured by other tools (e.g. performance monitoring tools or other monitoring tools) during normal operation and may store the received metrics. In still other cases, the recovery manager 16 may monitor during normal operation to accumulate metrics, or a combination of the recovery manager 16 monitoring to accumulate metrics and receiving metrics from other sources may be implemented. The recovery manager 16 may store the metrics in the metric data 18 (block 22).

FIG. 3 is a flowchart illustrating operation of one embodiment of the recovery manager 16 for estimating the recovery time to recover one or more assets. The recovery manager 16 may include instructions which, when executed, implement the operation shown in FIG. 3. The operation shown in the flowchart of FIG. 3 may be performed when an asset or assets have been selected for recovery and a recovery method has been selected for the asset or assets.

The recovery manager 16 may detect the current configuration and/or conditions for the host 10 that correspond to metrics in the metric data 18 (block 30). For example, the hardware capabilities, the software (particularly the software implementing the recovery method), and the network activity and other resource utilization may be detected. Discovery methods may be used, in some cases, to detect the configuration.

The recovery manager 16 may compare the detected current configuration/conditions to the corresponding metrics for each entry in the metric data 18 (block 32). Entries having similar configuration/conditions may be selected from which to estimate the recovery time. Generally, a recovery operation for an asset of a given size stored on a similar media restored to a similar location under similar conditions to another recovery operation may be expected to complete in approximately the same amount of time as the other recovery operation. Thus, the recovery times for previous similar recovery operations may be used to estimate the recovery time for the current recovery operation. The recovery manager 16 may attempt to account for differences that may exist between the current recovery operation and the metric data 18 by extrapolating from the metric data 18.

For example, if a recovery of an asset having a different size has been performed in an otherwise similar recovery operation, the previous recovery time may be adjusted based on the relative size of the current recovery operation and the previous recovery operation. Similarly, times from the metric data 18 may be adjusted to account for other differences. For example, the current asset state to be recovered may be used to account for differences, such as differences in the transaction log size of a database. A database having a smaller transaction log may be expected to be recovered in less time than a database having a larger transaction log, for example.

The comparison may also be used to eliminate entries from the metric data 18 from being used to estimate the recovery time. That is, if the previous data protection operation is different enough from the recovery operation, it may not be considered in formulating the estimate. Various thresholds for determining that an entry is to be eliminated may be used in various embodiments.

It is noted that, while the recovery manager 16 is attempting to estimate the recovery time for a recovery operation, metrics from other data protection operations may be used in the calculation. For example, metrics for an asset copy operation corresponding to the type of recovery operation being performed may be used to estimate the recovery time. That is, an asset copy operation for an asset of similar size using the same protection method as the recovery method and otherwise similar in other metrics (hardware capabilities, software, etc.) may be used to estimate the recovery time. As mentioned above, metrics accumulated during normal operation may be used to estimate the recovery time as well. For example, metrics indicating historical activity levels based on time of day or day of week may be used to estimate recovery time based on the time of day or day of week that the recovery is attempted.

The recovery manager 16 may estimate the recovery time using the selected entries from the metric data 18 (block 34). If more than one entry is selected, the times from the selected entries may be combined in some way to form the estimate. For example, the average or the mean of the times may be used as an estimate. If some entries correspond to operations that are more similar to the current recovery operation than others, the times corresponding to the more similar entries may be weighted more heavily in the estimate. In other embodiments, various statistical analysis algorithms may be used to form an estimate from the metric data 18. The recovery manager 16 may report the estimated recovery time to the user (block 36).

In other embodiments, the metric data 18 may be used to help validate recoverability. That is, the metric data 18 may be used to help validate if SLAs can be met. While using measurements of actual recoveries may provide the most accurate validation of recoverability, actual recoveries are less frequent in occurrence than other operations. Generating recovery metrics through testing is also sometimes used (e.g. trial runs on a similarly-configured host), but may be expensive to perform.

The recovery manager 16 may be configured to determine recovery metrics from the data that is available in the metric data 18. Varying levels of accuracy may be realized depending on the available data, but an indication of whether or not SLAs can be met may be calculated.

FIG. 4 is a flowchart illustrating operation of one embodiment of the recovery manager 16 for validating recoverability. The recovery manager 16 may include instructions which, when executed, implement the operation shown in FIG. 4. The operation shown in the flowchart of FIG. 4 may be performed when an asset or assets have been selected for validation and a recovery method has been selected for the asset or assets. In other embodiments, the validation may be performed for a recovery class and the corresponding protection plan selected based on the recovery class (and thus the implied recovery method), either based on an assumed asset or assets or in connection with a real asset or assets.

The recovery manager 16 may accept user input identifying the desired accuracy of the validation (block 40). For example, the recovery manager 16 may display the supported calculation methods (or cause the methods to be displayed) to the user and the user may select the desired method. Alternatively, the user may input accuracy preferences in a qualitative sense (e.g. sliding a slider bar between most accurate and least accurate).

The recovery manager 16 may select the validation method based on the user input (block 42) and may calculate recovery metrics using the selected validation method (block 44). The recovery manager 16 may support various validation methods. For example, in one embodiment, the validation methods may include computation of estimated recovery metrics using existing statistical data (e.g. the metric data 18), computation of estimated recovery metrics using testing or simulations, and determination of recovery metrics using actual recovery execution (either in a test environment or, if actual recovery of the assets in question is recorded in the metric data 18, using the metric data 18).

Computation of estimated recovery metrics using existing statistical data may be similar to the estimation of the recovery time described above with regard to FIG. 3, except that the estimation is not being made at the time a recovery is desired. In fact, the estimated recovery time of FIG. 3, in the context of FIG. 4, may be the estimated recovery time metric for the asset, using the recovery method specified for recovery validation. A recovery point estimate may be made, e.g. based on the frequency that the protection methods in the protection plan are activated to capture a copy of the asset. Alternatively, various statistical methods may be used (e.g. Monte Carlo analysis). While this method may have the least accuracy of the above methods, this method may also be the least expensive to implement and may be the quickest.

Computation of estimated recovery metrics using testing or simulations may be more accurate than computation using existing statistical data, but may take longer. If this method is selected, the recovery manager 16 may perform the trial runs/simulations to collect the statistical data, and may estimate the recovery metrics using the statistical data. For example, the testing may include testing various aspects of the recovery (e.g. verifying the media on which an asset copy is stored, verifying the data integrity of the asset, verifying data path connectivity to the asset copy, and/or verifying the data path performance). Measuring metrics for these aspects provides data that may be used to formulate a recovery metric estimate. Additionally, testing may include performing a partial recovery or a full recovery of the asset. Typically, such testing may be performed on a similarly-configured host, either on site with the host 10 or elsewhere, such as a disaster recovery site. Such testing may be more accurate than testing aspects or simulation, but still may be subject to error since the testing is not performed on the host 10 itself.

Finally, actual recoveries may be performed to generate the recovery metrics. This option may be the most accurate, but also may be the most expensive to perform. The host 10 may be partially or fully removed from the "production environment" during the recovery operations, which may reduce the capabilities of the production environment temporarily.

In other embodiments, rather than performing the testing/simulation or actual recovery during recoverability validation, the recover manager 16 may draw corresponding data from the metric data 18 for the selected validation method. By providing the user with a choice of methods, the user may choose a less accurate method for which data is available and thus still validate recoverability with some level of accuracy. In some cases, more data may be available in the metric data 18 for one of the less accurate validation methods than is available for the more accurate validation methods, and thus using the less accurate validation method may lead to a more accurate estimate due to the larger amount of available data. In some cases, no data may be available for one or more of the more accurate validation methods.

The recovery manager may provide the calculated recovery metrics to the user (block 46). Alternatively, the user may identify the recovery targets to the recovery manager 16, and the recovery manager 16 may report whether or not the calculated recovery metrics meet the recovery targets. For example, if recovery classes and/or RT sets are used, the recovery targets are indicated in the RT sets. Alternatively, the user may input the recovery targets to the recovery manager 16 for comparison to the calculated recovery metrics.

In other embodiments, the recovery manager 16 may analyze the metric data 18 to determine what data exists to validate recoverability, and may automatically choose the most accurate method for which data exists to validate recoverability. FIG. 5 is a flowchart illustrating operation of one embodiment of the recovery manager 16 using automatic data evaluation. The recovery manager 16 may include instructions which, when executed, implement the operation shown in FIG. 5.

The recovery manager 16 analyzes the metric data 18 to determine whether or not data exists corresponding to the various validation methods and selects the most accurate method (block 50). For example, if actual recoveries of the asset for which recoverability is being validated are recorded in the metric data 18, the actual recovery method may be selected. If testing or simulation data is recorded in the metric data 18, the computation using testing/simulation method may be used. If neither of the above is available, the computation using existing statistical data may be used.

In yet another alternative, the recovery manager 16 may analyze the metric data 18 and may identify which validation methods may be used based on the metric data 18. The recovery manager 16 may provide the user with the choice of available methods. The recovery manager 16 may further provide an indication of how much data is available for each validation method (e.g. the number of data points in the metric data 18 that may be used for the validation method). The user may select which method to use.

Once the validation method is selected, operation of FIG. 5 may be similar to FIG. 4 (calculating the recovery metrics using the selected validation method, block 44, and providing the calculated metrics to the user or comparing the calculated metrics to the recovery targets and reporting if the targets are met, block 46).

In other embodiments, the recovery manager 16 may provide decision support for the user, displaying to the user the current recovery metrics, the corresponding recovery targets, and the corresponding recovery objectives. FIG. 6 is a flowchart illustrating operation of one embodiment of the recovery manager 16 for providing such decision support. The recovery manager 16 may include instructions which, when executed, implement the operation shown in FIG. 6.

The recovery manager 16 may calculate recovery metrics from the metric data (block 60). In some embodiments, the calculation may be similar to the estimation of recovery time described above with respect to FIG. 3, or the calculation of recovery metrics using the various validation methods as described above with respect to FIGS. 4 and 5.

The recovery manager 16 may present the recovery metrics, the corresponding recovery targets, and the corresponding recovery objectives to the user (block 62). The recovery targets may be drawn from the RT sets, if recovery classes and/or RT sets are used. Recovery objectives may be supplied from the disaster recovery/business continuity departments.

Presentation may take on different forms in different embodiments. Generally, the presentation is intended to provide the user with the information regarding how close the recovery metrics are to the corresponding recovery targets and recovery objectives. Additionally, the decision support features may provide the user with functionality to experiment with different protection configurations to improve the recovery metrics, and perhaps over time improve the match between recovery targets and recovery objectives as well.

For example, the recovery manager 16 may display the differences between the recovery metrics, targets, and objectives. In some embodiments, the recovery manager 16 may provide the user with the option to attempt to automatically work toward the recovery objectives. In such an embodiment, the recovery manager 16 may attempt to modify the protection system automatically (e.g. by acquiring resources or attempting to negotiate for resources) to improve toward meeting the objectives. In another example, the recovery manager 16 may report how often the recovery metrics do not meet the recovery targets, and how often the recovery metrics exceed the recovery targets (e.g. expressed as percentages of recoveries). In still other examples, the recovery manager 16 may identify areas for improvement. When additional resources may be acquired, the areas for improvement may indicate which resources should be acquired to provide the most improvement in the recovery metrics.

In some embodiments, the recovery manager 16 may support experimentation with different protection configurations. If the user modifies the protection configuration (decision block 64, "yes" leg), the recovery manager 16 may calculate new estimated recovery metrics for the new configuration and may present the recovery metrics, recovery targets, and recovery objectives (blocks 62 and 64).

In various embodiments above, recovery metrics are estimated using metric data. The level of accuracy of the estimations may vary dependent on the available metric data and/or the methods used to estimate the recovery metrics. In some embodiments, the recovery manager 16 may determine the accuracy of the estimated metrics, and may present the accuracy to the user. The user may choose to refine the estimations by selecting a more accurate method for estimating the metrics, if desired.

Figure 7:
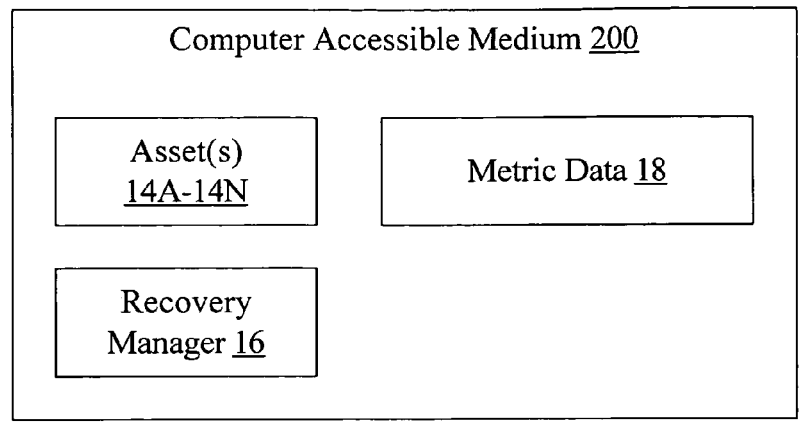
FIG. 7 is a block diagram of one embodiment of a computer accessible medium.

Turning now to FIG. 7, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 7 may be store one or more of the assets 14A-14N, the metric 18, and/or the recovery manager 16. The recovery manager 16 may comprise instructions which, when executed, implement the operation described herein for the recover manager 16. Generally, the computer accessible medium 200 may store any set of instructions which, when executed, implement a portion or all of the flowcharts shown in one or more of FIGS. 2, 3, 4, 5, and 6.

Figure 8:
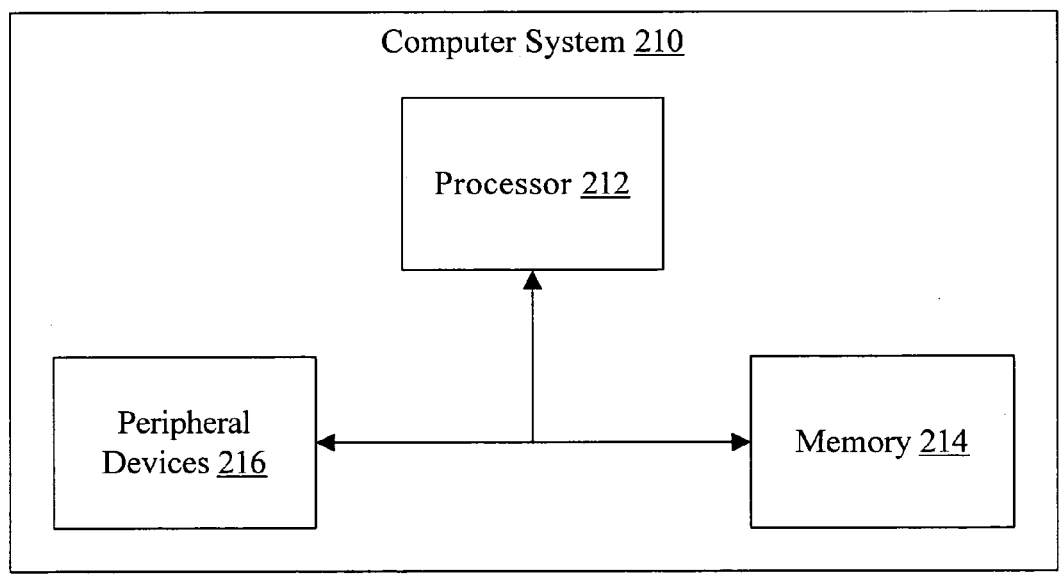
FIG. 8 is a block diagram of one embodiment of a computer system.

FIG. 8 is a block diagram of one embodiment of an exemplary computer system 210. In the embodiment of FIG. 22, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
    a computer estimating a recovery time for recovery of at least one asset responsive to at least one metric represented in metric data accumulated prior to the estimating;
    the computer reporting the estimated recovery time to a user;
    the computer selecting one of a plurality of methods to calculate one or more recovery metrics, each of the plurality of methods having a different level of accuracy;
    the computer calculating the one or more recovery metrics responsive to the selected method; and
    the computer reporting the one or more recovery metrics to the user.

2. The method as recited in claim 1 wherein at least a portion of the metric data is accumulated during one or more data protection operations.

3. The method as recited in claim 2 wherein the one or more data protection operations comprise one or more previously performed asset copy operations.

4. The method as recited in claim 2 wherein the one or more data protection operations comprise one or more previously performed recovery operations.

5. The method as recited in claim 2 wherein the one or more data protection operations comprise one or more previously performed testing operations, each testing operation testing one or more aspects of recovery.

6. The method as recited in claim 2 wherein the one or more data protection operations comprise one or more previously performed simulations.

7. The method as recited in claim 2 wherein the one or more data protection operations comprise one or more previously performed test recovery operations.

8. The method as recited in claim 2 further comprising:
    measuring at least one metric during one of the one or more data protection operations; and
    representing the metric in the metric data.

9. The method as recited in claim 1 wherein the selecting is automatic based on availability of data used by the plurality of methods in the metric data.

10. The method as recited in claim 1 wherein the selecting is performed responsive to user input.

11. The method as recited in claim 1 further comprising presenting the level of accuracy corresponding to the selected one of the plurality of methods to the user.

12. The method as recited in claim 11 further comprising accepting user input to select a different one of the plurality of methods having a higher level of accuracy than the selected one of the plurality of methods.

13. The method as recited in claim 1 further comprising presenting the one or more recovery metrics, a corresponding one or more recovery targets, and a corresponding one or more recovery objectives to the user.

14. The method as recited in claim 13 further comprising:
    modifying a protection configuration;
    recalculating the one or more recovery metrics responsive to the modifying; and
    presenting the recalculated one or more recovery metrics, the corresponding one or more recovery targets, and the corresponding one or more recovery objectives to the user.

15. The method as recited in claim 1 wherein at least a portion of the metric data is accumulated during operation of the at least one asset.

16. The method as recited in claim 1 wherein the metric data includes one or more metrics accumulated by a performance monitoring tool.

17. A non-transitory computer accessible storage medium storing a plurality of instructions comprising instructions which, when executed on a computer, implement a method comprising:
    estimating a recovery time for recovery of at least one asset responsive to at least one metric represented in metric data accumulated prior to the estimating;
    reporting the estimated recovery time to a user;
    selecting one of a plurality of methods to calculate one or more recovery metrics, each of the plurality of methods having a different level of accuracy;
    calculating the one or more recovery metrics responsive to the selected method; and
    reporting the one or more recovery metrics to the user.

18. The non-transitory computer accessible storage medium as recited in claim 17 wherein at least a portion of the metric data is accumulated during one or more data protection operations.

19. The non-transitory computer accessible storage medium as recited in claim 18 wherein the one or more data protection operations comprise one or more previously performed asset copy operations.

20. The non-transitory computer accessible storage medium as recited in claim 18 wherein the one or more data protection operations comprise one or more previously performed recovery operations.

21. The non-transitory computer accessible storage medium as recited in claim 18 wherein the one or more data protection operations comprise one or more previously performed testing operations, each testing operation testing one or more aspects of recovery.

22. The non-transitory computer accessible storage medium as recited in claim 18 wherein the one or more data protection operations comprise one or more previously performed simulations.

23. The non-transitory computer accessible storage medium as recited in claim 18 wherein the one or more data protection operations comprise one or more previously performed test recovery operations.

24. The non-transitory computer accessible storage medium as recited in claim 18 wherein the method further comprises:
    measuring the at least one metric during one of the one or more data protection operations; and
    representing the metric in the metric data.

25. The non-transitory computer accessible storage medium as recited in claim 17 wherein the selecting is automatic based on availability of data used by the plurality of methods in the metric data.

26. The non-transitory computer accessible storage medium as recited in claim 17 wherein the selecting is performed responsive to user input.

27. The non-transitory computer accessible storage medium as recited in claim 17 further comprising presenting the level of accuracy corresponding to the selected one of the plurality of methods to the user.

28. The non-transitory computer accessible storage medium as recited in claim 27 further comprising accepting user input to select a different one of the plurality of methods having a higher level of accuracy than the selected one of the plurality of methods.

29. The non-transitory computer accessible storage medium as recited in claim 17 wherein the method further comprises presenting the one or more recovery metrics, a corresponding one or more recovery targets, and a corresponding one or more recovery objectives to the user.

30. The non-transitory computer accessible storage medium as recited in claim 17 wherein the method further comprises:

modifying a protection configuration;
recalculating the one or more recovery metrics responsive to the modifying; and
presenting the recalculated one or more recovery metrics, the corresponding one or more recovery targets, and the corresponding one or more recovery objectives to the user.

31. The non-transitory computer accessible storage medium as recited in claim 17 wherein at least a portion of the metric data is accumulated during operation of the at least one asset.

32. The non-transitory computer accessible storage medium as recited in claim 17 wherein the metric data includes one or more metrics accumulated by a performance monitoring tool.

* * * * *